United States Patent
Dedhia

(10) Patent No.: US 10,275,419 B2
(45) Date of Patent: *Apr. 30, 2019

(54) PERSONALIZED SEARCH

(71) Applicant: EXCALIBUR IP, LLC, New York, NY (US)

(72) Inventor: Harshal D. Dedhia, Santa Clara, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,878

(22) Filed: Nov. 22, 2016

(65) Prior Publication Data

US 2017/0076002 A1 Mar. 16, 2017

Related U.S. Application Data

(63) Continuation of application No. 11/556,068, filed on Nov. 2, 2006, now Pat. No. 9,519,715.

(51) Int. Cl.
*G06F 17/30* (2006.01)
*G06F 16/9535* (2019.01)
*G06F 16/248* (2019.01)
*G06F 16/28* (2019.01)

(52) U.S. Cl.
CPC ........ *G06F 16/9535* (2019.01); *G06F 16/248* (2019.01); *G06F 16/285* (2019.01); *G06F 17/30554* (2013.01); *G06F 17/30598* (2013.01); *G06F 17/30867* (2013.01)

(58) Field of Classification Search
CPC ......... G06F 17/30867; G06F 17/30554; G06F 17/30598
See application file for complete search history.

(56) References Cited

U.S. PATENT DOCUMENTS

| | | |
|---|---|---|
| 5,953,718 A | 9/1999 | Wical |
| 5,987,457 A | 11/1999 | Ballard |
| 6,169,896 B1 | 1/2001 | Sant et al. |
| 6,236,987 B1 | 5/2001 | Horowitz et al. |
| 6,292,796 B1 | 9/2001 | Drucker et al. |
| 6,460,034 B1 | 10/2002 | Wical |
| 6,480,835 B1 | 11/2002 | Light |

(Continued)

OTHER PUBLICATIONS

Pretschner et al, Ontology Based Personalized Search, Nov. 1999, Proc. 11th IEEE Intl. Conf. on Tools with Artificial Intelligence, pp. 391-398, Chicago.

(Continued)

*Primary Examiner* — Huawen A Peng
(74) *Attorney, Agent, or Firm* — James J. DeCarlo; Greenberg Traurig, LLP

(57) ABSTRACT

Systems and methods have been developed for performing an advanced or detailed search based on information previously collected about a searcher's interests. In response to a search request, the searcher's interests are retrieved and inspected. In an embodiment, the interests may be obtained from multiple systems including those not associated with the search system. Based on the searcher's interests, the search request may be limited or otherwise modified from the actual request received. The results of the limited search may then presented to the searcher as the results of the requested search.

20 Claims, 7 Drawing Sheets

(56) References Cited

U.S. PATENT DOCUMENTS

| | | |
|---|---|---|
| 6,505,196 B2 | 1/2003 | Drucker et al. |
| 6,691,106 B1 | 2/2004 | Sathyanarayan |
| 6,728,706 B2 | 4/2004 | Aggarwal et al. |
| 7,092,936 B1 | 8/2006 | Alonso et al. |
| 7,194,454 B2 | 3/2007 | Hansen et al. |
| 7,296,016 B1 | 11/2007 | Farach-Colton et al. |
| 7,321,892 B2 | 1/2008 | Vadon et al. |
| 7,401,074 B2 | 7/2008 | Liu et al. |
| 7,475,072 B1 | 1/2009 | Ershov |
| 7,599,916 B2 | 10/2009 | Weare |
| 7,818,315 B2 | 10/2010 | Cucerzan et al. |
| 7,895,193 B2 | 2/2011 | Cucerzan et al. |
| 2002/0016786 A1 | 2/2002 | Pitkow et al. |
| 2002/0078045 A1 | 6/2002 | Dutta |
| 2002/0107843 A1 | 8/2002 | Biebesheimer et al. |
| 2002/0143759 A1 | 10/2002 | Yu |
| 2003/0037041 A1 | 2/2003 | Hertz |
| 2004/0030688 A1 | 2/2004 | Aridor et al. |
| 2004/0199496 A1 | 10/2004 | Liu et al. |
| 2005/0071328 A1* | 3/2005 | Lawrence ......... G06F 17/30867 |
| 2005/0080771 A1 | 4/2005 | Fish |
| 2005/0125391 A1 | 6/2005 | Curtis et al. |
| 2005/0160082 A1 | 7/2005 | Dawson |
| 2005/0240580 A1 | 10/2005 | Zamir et al. |
| 2005/0278317 A1 | 12/2005 | Gross et al. |
| 2006/0022458 A1 | 2/2006 | Droste et al. |
| 2006/0026147 A1 | 2/2006 | Cone et al. |
| 2006/0074853 A1 | 4/2006 | Liu et al. |
| 2006/0074883 A1 | 4/2006 | Teevan et al. |
| 2006/0136589 A1 | 6/2006 | Konig et al. |
| 2006/0218111 A1 | 9/2006 | Cohen |
| 2006/0218138 A1 | 9/2006 | Weare |
| 2006/0224554 A1 | 10/2006 | Bailey et al. |
| 2006/0224583 A1 | 10/2006 | Fikes et al. |
| 2006/0224587 A1 | 10/2006 | Zamir et al. |
| 2006/0224608 A1 | 10/2006 | Zamir et al. |
| 2006/0224615 A1 | 10/2006 | Korn et al. |
| 2006/0224624 A1 | 10/2006 | Korn et al. |
| 2006/0224938 A1 | 10/2006 | Fikes et al. |
| 2006/0230022 A1 | 10/2006 | Bailey et al. |
| 2006/0248059 A1 | 11/2006 | Chi et al. |
| 2006/0277189 A1 | 12/2006 | Cencini |
| 2007/0011154 A1 | 1/2007 | Musgrove et al. |
| 2007/0061333 A1 | 3/2007 | Ramer et al. |
| 2007/0078822 A1* | 4/2007 | Cucerzan ......... G06F 17/30864 |
| 2007/0198500 A1 | 8/2007 | Lucovsky et al. |
| 2007/0214133 A1 | 9/2007 | Liberty et al. |
| 2007/0276801 A1 | 11/2007 | Lawrence et al. |
| 2007/0294225 A1 | 12/2007 | Radlinski et al. |
| 2007/0294240 A1 | 12/2007 | Steele et al. |
| 2007/0294615 A1 | 12/2007 | Sathe |
| 2008/0021878 A1 | 1/2008 | Jeong |
| 2008/0077558 A1 | 3/2008 | Lawrence et al. |
| 2008/0091670 A1 | 4/2008 | Ismalon |
| 2008/0104042 A1 | 5/2008 | Gutt et al. |
| 2008/0114751 A1 | 5/2008 | Cramer et al. |
| 2008/0126303 A1 | 5/2008 | Park et al. |
| 2010/0228715 A1 | 9/2010 | Lawrence |

OTHER PUBLICATIONS

Pitkow et al, Personalized Search: A contextual computing approach may prove a breakthrough in personalized search efficiency, Sep. 2002, Communications of the ACM, vol. 45, No. 9, pp. 50-55.

* cited by examiner

FIG. 5

PERSONALIZED SEARCH

This application is a continuation of and claims priority to U.S. patent application Ser. No. 11/556,068, filed on Nov. 2, 2006, entitled "Personalized Search", which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

As the Internet becomes a more accepted source for obtaining information, the need for effective systems and methods for searching the Internet has increased. Because of the shear volume of information now available, it is not uncommon to perform keyword searches with typical search engines, such as Google, Yahoo! and Excite, and receive more that 100 pages of results. Therefore, it is becoming increasingly difficult for client users of the search engines to find the actual information they are searching for within the very large number of search results.

In response, many search engines and other search utilities now provide "advanced search" interfaces through which searchers may input many different parameters beyond simple keyword entry. For example, in Yahoo!'s advanced web page search interface, a searcher may select any combination of different relationships between keywords in a search (e.g., "all of these words", "the exact phrase", "any of these words", and "none of these words"), a temporal limitation on when the web page was last updated, a limitation on what top-level domain names to search, a limitation based on available legal rights, file format limitations, filter limitations, country and language limitations, among other parameters. Through the advanced search interface, sophisticated searchers can significantly narrow the results set of a search and more easily find the exact information they are looking for.

The advanced search systems and interfaces, while very powerful, are under-utilized by many, possibly a majority, of a search engine's clients. Most clients are unsophisticated and use only simple keyword searches. One reason for this is that advanced searches typically utilize a large and complicated advance search interface that can discourage unsophisticated users. As a result, these clients are typically frustrated by the shear volume of simple keyword search results and often blame their frustration on the quality of the search engine.

SUMMARY

Against this backdrop systems and methods have been developed for performing an advanced or detailed search based on information previously collected about a searcher's interests. In response to a search request, the searcher's interests are retrieved and inspected. In an embodiment, the interests may be obtained from multiple systems including those not associated with the search system. Based on the searcher's interests, the search request may be limited or otherwise modified from the actual request received. The results of the limited search may then presented to the searcher as the results of the requested search.

In one aspect, the disclosure describes a method for searching an index. The method includes receiving a first search query from a client, in which the first search query contains one or more first search terms and is part of or related to a command to search the index for entries matching the one or more first search terms. The method includes retrieving historical client interest data associated with the client, the historical client interest data including at least some information passively collected from the client based on the client's past actions and dynamically selecting one or more client limitations based on historical client interest data associated with the client. The index is searched for entries matching the one or more first search terms and the one or more client limitations associated with the client. The method includes transmitting limited search results to the client, in which the limited search results identify the entries matching the one or more first search terms and one or more client limitations.

Another aspect of the disclosure is a method of performing searches of an index that maintains information indicative of a searcher's prior interests and in response to a search request from a searcher with known prior interests, compares the search request to the known prior interests. The method includes searching the index and generating a full results set of entries matching the search request. In addition, the method includes modifying, based on the known prior interests, the full results set to create a modified results set.

In yet another aspect, the disclosure describes a system for searching an index. Among other things the system includes a searchable index of entries; a search module adapted to search for entries matching search terms and search parameters; a personalization module adapted to receive a search request from a client and, if the search request is from a client with known interests, to create a limited search request from the received search request and transmit the limited search request to the search module; a communication module adapted to transmit search results to the client; and a client interest datastore containing known interests of clients.

In yet another aspect, the disclosure describes a method of searching an index that includes receiving a basic search request from a client, the basic search request including search terms. The method further includes generating advanced search parameters for the client based on known interests of the client and performing an advanced search using the advanced search parameters and the search terms. In addition, the method includes returning a limited results set generated by the advanced search as the results of the basic search request.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

FIG. 5 illustrates the full results that would be obtained from the search query "Pacific Heights" absent any personalization.

DETAILED DESCRIPTION

The disclosure describes systems and methods for use by a search engine that perform very well at providing useful results tailored to the interests of the user performing the search.

Figure 1:
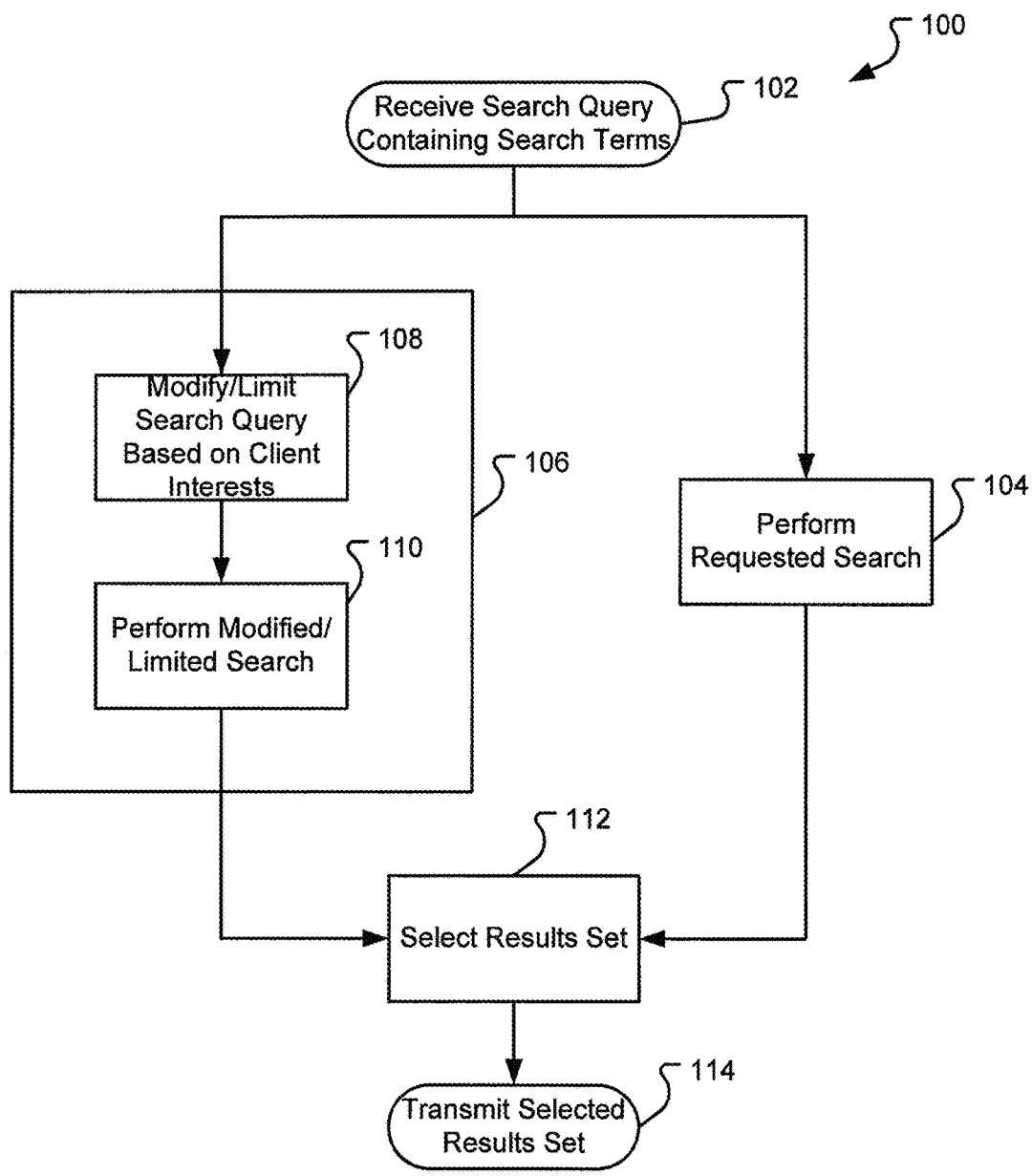
FIG. 1 illustrates an embodiment of a method of performing a search.

FIG. 1 illustrates an embodiment of a method 100 of performing a search. The method 100 will be described in the context of searching an index containing entries. In this example, a search query is generated by a client or other searcher and the client desires to see a list or other results set identifying those entries in the index that match the search results of the search query. A very simple example includes performing a keyword search of an index of data, e.g., an index of web pages, a database of song titles, a listing of real estate properties, etc. However, one skilled in the art will recognize that the methods and systems described herein may be adapted to be used as part of or in conjunction with more advanced search queries and search systems.

In the method 100, a search query is received from a client in a receive search query operation 102. The search query may contain a set of one or more search terms such as keywords. In an embodiment, the search query may also contain one or more limiting search parameters, such as database identifiers or advanced relationship. In an embodiment, the search query may be included as part of a search request that requests the system to perform the search and return the findings in a results set. For example, the client may enter the one or more search terms into a text book on a user interface associated with the search system and select a control, such as a button, thereby transmitting a search request containing the search terms to the system.

In an embodiment, after the search query is received, the system performs a search of the index as directed by the search query in a search operation 104. The search operation 104 generates a results set, referred to herein as the full results set, of entries in the index that match the search query as it was provided by the client.

In the method 100, in addition to the full search operation 104 the system also performs a personalized search operation 106 if the client that generated the search query is known to the system. In the embodiment shown, the search operation 104 and the personalized search operation 106 are illustrated as being performed in parallel. The operations 104, 106 may be performed independently and concurrently. In an alternative embodiment, however, the operations 104, 106 may be performed in any order that supports providing the results sets as described herein, e.g., the full search operation 104 may not be performed until a client specifically requests the full results set, or the full search operation 104 may be performed and then the personalized search operation 106 may be performed utilizing the full results set. Other alternatives are possible and within the scope of this disclosure.

The personalized search 106 may include many, detailed operations as described in greater detail below. In high-level embodiment illustrated in FIG. 1, the personalized search 106 includes a search query modification operation 108 and a limited search operation 110. In the search query modification operation 108 the system identifies the client that generated the search query and retrieves information concerning that client's interests. The client interest information is discussed in greater detail below.

The client interest information is then used to modify and/or limit the search query received from the client. As discussed in greater detail below, the modification may include adding one or more search terms, e.g., keywords, to the search query. In addition, the search query modification operation 108 may include selecting one or more search parameters to limit the search query.

The selection of search terms and/or search parameters is based on the past history and other information known to the system about the client. Such information may have been provided as part of the client registration process. Alternatively or in addition, such information may have been developed over time by monitoring the actions of the client. For example, if the client has performed numerous searches for real estate in the San Francisco Bay area, the search system may select San Francisco Bay as a search parameter or search term automatically for future searches of the index for real estate.

For example, in an embodiment, the search query received is a typical keyword search containing one more terms in the form of keywords. From this keyword search query, the system creates an limited search query that is an advanced search query utilizing one or more of the various parameters found in advanced search utilities. In this way, the client gets the benefit of the advance search without the need to use the advance search interface.

A limited search operation 110 is then performed. The limited search operation 110 performs a search of the index using the modified/limited search query generated by the search query modification operation 108 to generate a limited search results set.

In the embodiment shown, a results selection operation 112 then selects which results set to transmit to the client. The results selection operation 112 may automatically select the limited search results set whenever that is available. In an alternative embodiment, information associated with the client may be inspected in order to determine if the client has indicated a preference and, if so, the preferred results set is selected. In yet another embodiment, the client may be prompted for which results set to transmit and the prompt may include information about the limited search operation 110 or information providing a high-level comparison of the results set (e.g., "The full results of the search include over 1 billion pages, would you like to see the results of your search limited to the San Francisco Bay area?", or "The full result set of your search 'Iraq' and 'war' is very large, would you like to limit this search to today's news from major news sites?"). The selection may then be made based on the client's response to the prompt.

After the selection has been made, the system transmits the selected results set in a transmit operation 114. The results set may be transmitted with information concerning the search performed and information about how to access the other search results. For example, in an embodiment the limited search results are automatically selected in the selection operation 112 and transmitted to the client in the transmit operation 114 as a web page that includes an indication of what limitations were used to generate the limited search results set and also a control for requesting the full results set.

The method 100 may be used to automatically perform an advanced search using parameters, terms and other limitations selected based on information known about the client. Thus, the method takes advantage of the advanced search capabilities of search systems but does not require the searcher to utilize a complicated advanced search interface.

Figure 2:
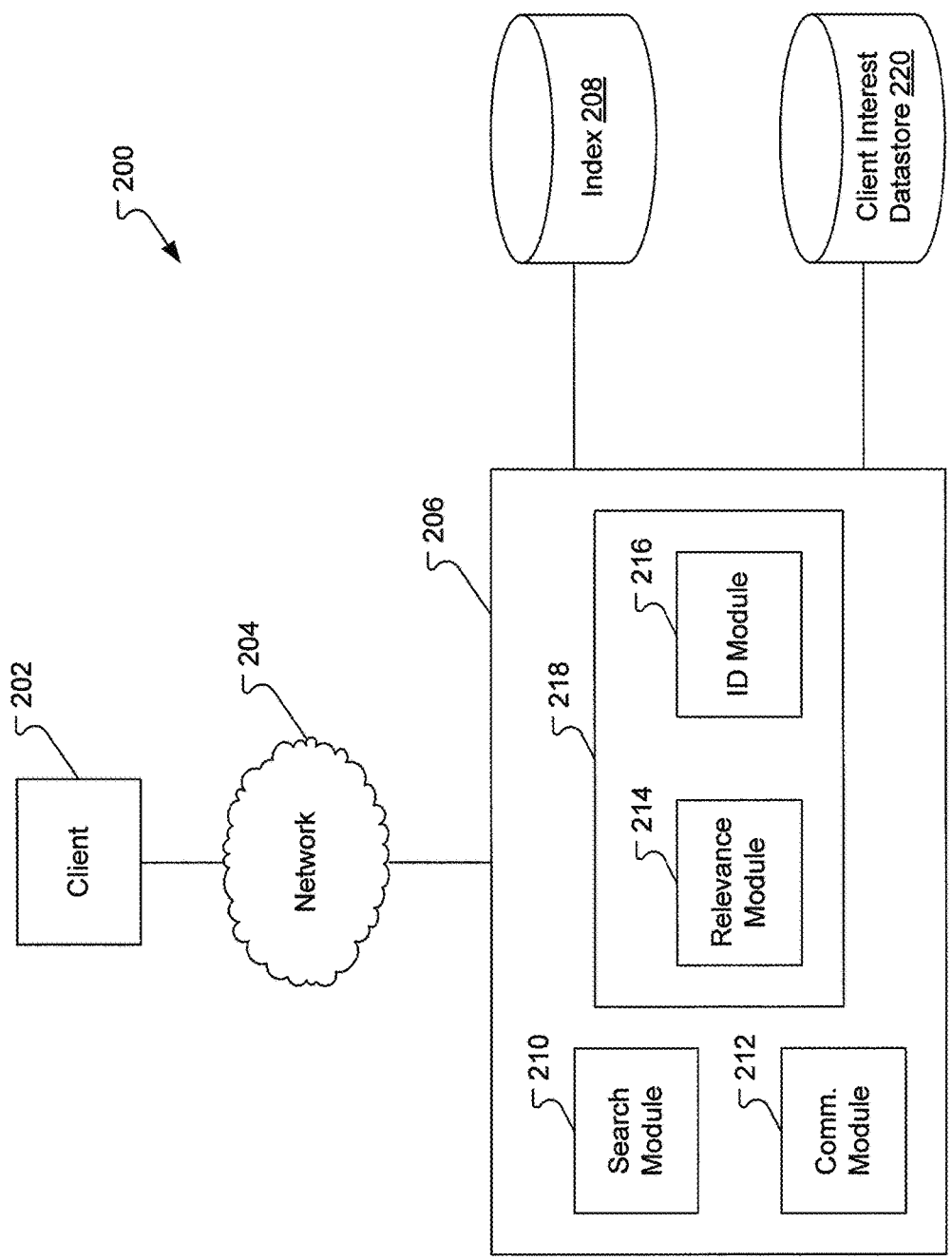
FIG. 2 illustrates an embodiment of a computing architecture that includes a system for performing personalized searches and which may be adapted to perform embodiments of the methods described herein.

FIG. 2 illustrates an embodiment of a computing architecture 200 that includes a system for performing personalized searches and which may be adapted to perform embodiments of the methods described herein. The architecture 200 includes a client 202 or other search query source connected via a network 204 to a search system 206 adapted to search an index 208.

In the embodiment shown, each of the various elements of the architecture could be separate computing devices that include a processor and memory for storing data and software as well as means for communicating with other computing devices, e.g., a network interface module. Computing devices may be provided with operating systems and may be adapted to execute software applications in order to manipulate data and communicate with other systems. Alternatively, some or all of the various elements could be combined on a single computing device and performed by one or more software applications that perform the functions described elsewhere herein. Examples of computing devices include personal computers, smart phones, personal data assistants, servers and mainframes. One skilled in the art will recognize that although referred to in the singular, a computing device may actually consist of a plurality of computing devices that operate together to provide data in response to requests from other computing devices.

In a computing device, local files, such as media files or raw data stored in a datastore, may be stored on a mass storage device (not shown) that is connected to or part of any of the computing device. A mass storage device and its associated computer-readable media, provide non-volatile storage for the computing device. Although the description of computer-readable media contained herein refers to a mass storage device, such as a hard disk or CD-ROM drive, it should be appreciated by those skilled in the art that computer-readable media can be any available media that can be accessed by the computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In an embodiment, the client 202 in the architecture may be a client computing device, such as a personal computer, smart phone, laptop computer, etc., connected to the system 206 via a network 204 like the Internet, a LAN, a WAN or a private computing network. Alternatively, the client 202 could be a software module that is requesting the system 206 to perform a search. In that alternative embodiment, the client 202 and the system 206 could be separate software processes executed by shared hardware resources. The client 202 could be an automated part of an independent system that needs searches performed or could be simple interface allows users to transmit search queries to the search system 206.

The index 208 may be any searchable index, database, data file or collection of data, that contains related data about items. Examples include an index of music data corresponding to song information such as title, artist, album, etc., a web page index of web page addresses with tokens or keywords corresponding to the words in the text or metadata of the web page, or a product index with entries containing searchable product specifications. Other examples are also possible and considered within the scope of this system. Indeed, the system may be adapted to work with any searchable index or database.

For the purposes of this disclosure, searchable indexes will be referred to as containing entries in order to facilitate the discussion and description of the various embodiments. The term entry and entries will be used in its most general sense to refer to related data stored within an index. However one skilled in the art will understand that depending upon the implementation some indexes, such as relational databases, do not actually contain identifiable data structures that correspond to entries as would be found in a list or other simple form of an index.

Figure 5:
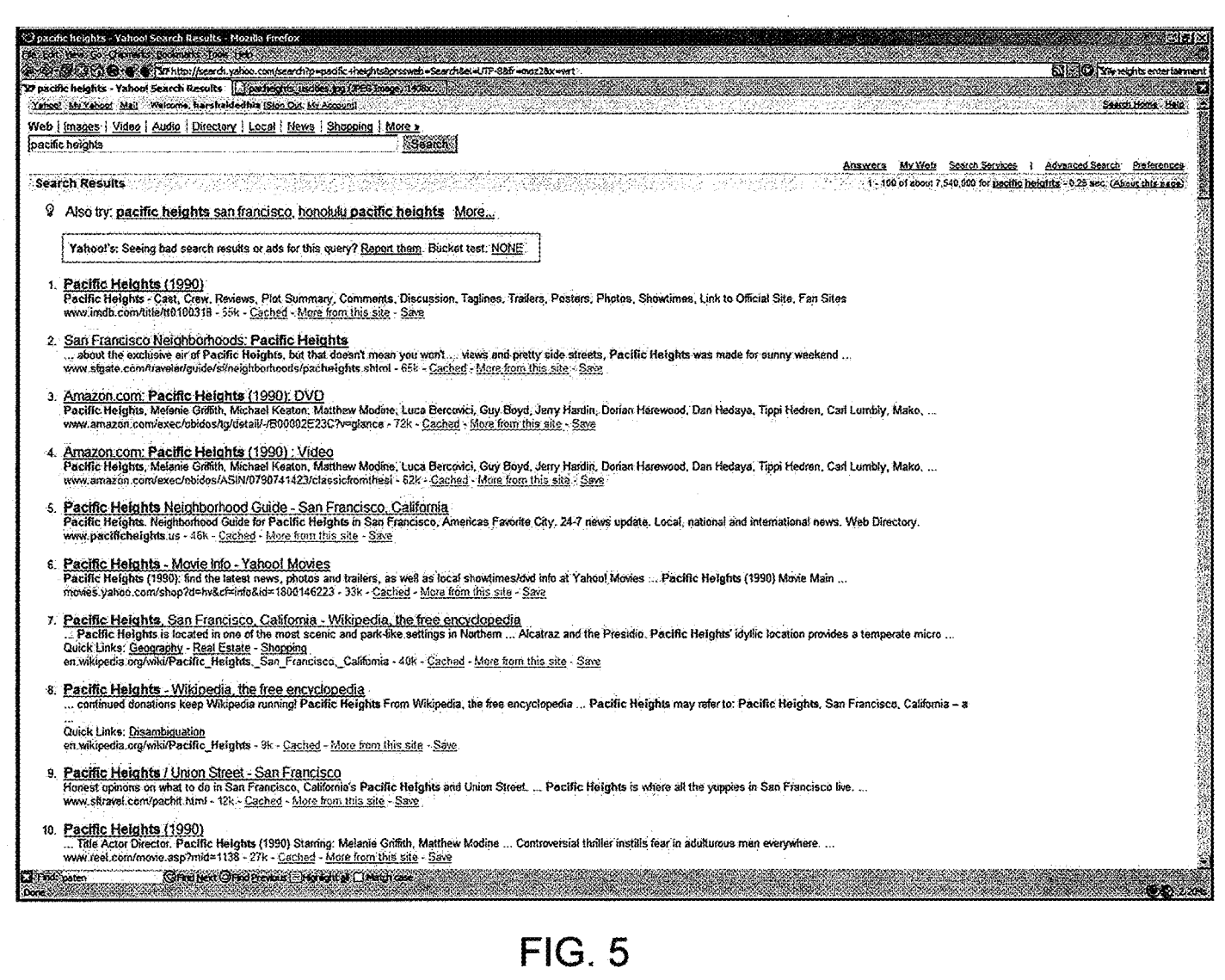
Figure 6:
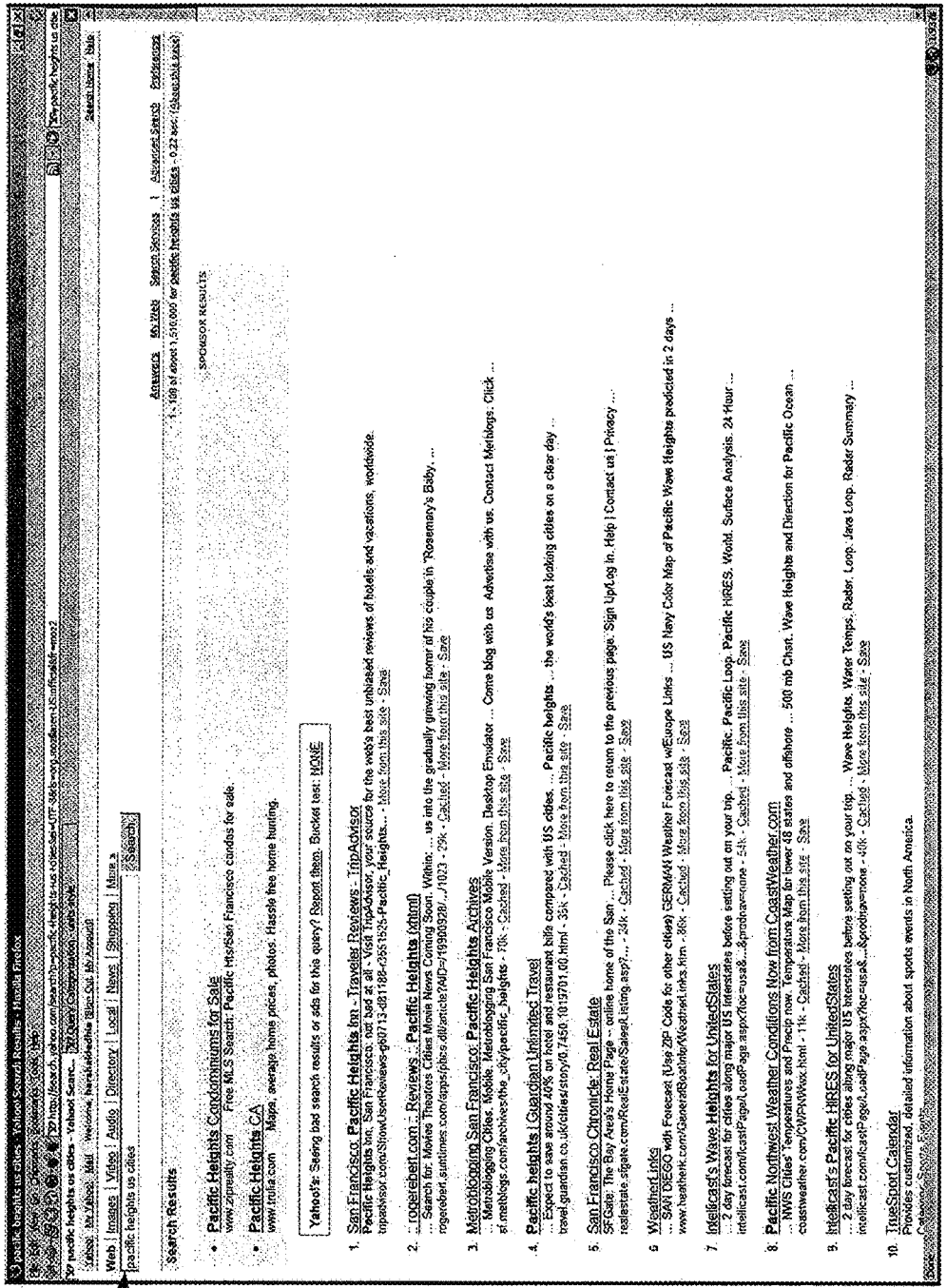
FIG. 6 illustrates the limited results set that would be displayed by an embodiment of the personalized search system in response to the search query "pacific heights" based on client interest data indicating that the client had real estate interests.
Figure 7:
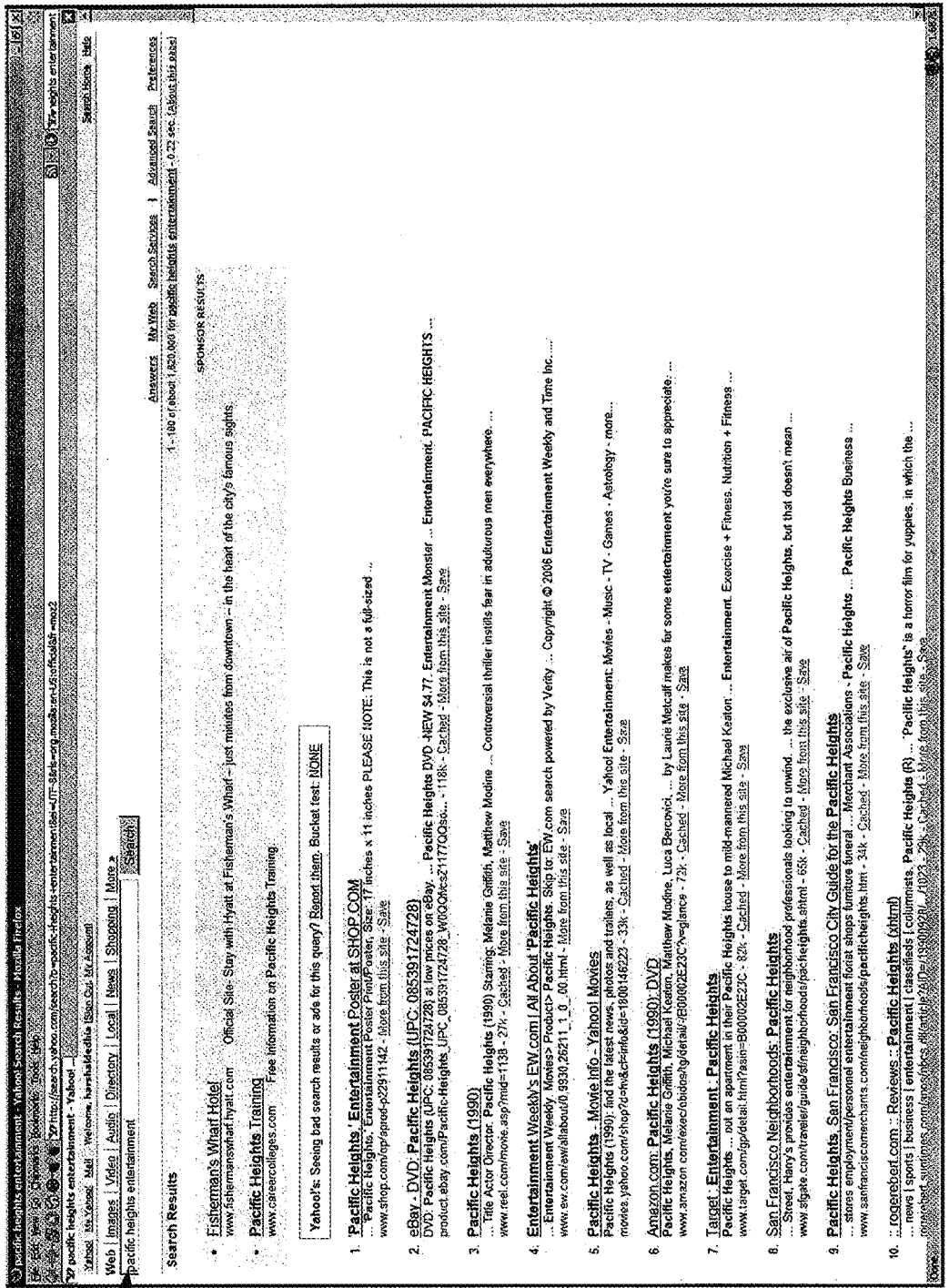
FIG. 7 illustrates the limited results set that would be displayed by an embodiment of the personalized search system in response to the search query "pacific heights" based on client interest data indicating that the client had entertainment interests.

The search system 206 is adapted to receive search requests from the client 202 and, ultimately, return search results to the client 202 in a form that is usable. To facilitate communication between the client 202 and search system 206, in the embodiment shown the search system is provided with a communication module 212. In an embodiment, the communication module 212 may provide a search interface through which the client 202 interacts with the search system 206. The interface may take many forms depending upon the architecture. For example, in an embodiment the client 202 is provided with a browser and interacts with the search system 206 via a web page provided by the communication module 212 an a manner that is known in the art. In an alternative embodiment, the communication module 212 may be adapted to interact with a dedicated application other than a browser that resides on the client 202. Depending on the embodiment, the communication module 212 may also be adapted to transmit the results, for example in the form of a web page as shown in FIGS. 5-7 to the client 202.

The search system 206 is further provided with a search module 210 that can perform searches on the index 208. In an embodiment, the search module 210 can perform what are commonly referred to as advanced searches in addition to simple keyword searches. The search module 210 may include different search engines or be adapted to perform multiple different search algorithms. Search engines and search algorithms are known in the art and any suitable type, now known or later developed, may be used in conjunction with the methods and systems described herein.

In addition to performing searches, the search system 206 is further adapted to "personalize" search requests as illustrated by the personalization module 218. The term "personalize" refers to modifying or limiting a search query or the display of search results based on information known about the client 202 that initially provided the search query. In an embodiment, the personalization is done automatically without any request on the part of the client 202. As such, the system 206 can be considered a system which returns only a limited subset of the information actually requested by the client 202. While it is anticipated that in some situations this will result in the client 202 not receiving the search results the client wants, for the most part it is assumed that the limitations will actually provide the client 202 with a batter results set for any given search and improve the client's perception of the utility of the search engine, possibly without the client's knowledge.

The personalization module 218 is adapted to receive a search request, or portion of a search request, containing a search query from a client 202, possibly via the communication module 212. The personalization module 218, as illustrated by the identification (ID) module 216, inspects the search request to determine if the client 202 source of the search request is known to the system 206. By known to the system, it is meant that the search system 206 (or an associated system (not shown), such as a community website, to which the search system 206 has access) can resolve the client 202 to a set of information, referred to herein generally as "interests," known to be associated with the client 202.

Client interest data differ from previously provided search limitations in that client interest data are generally not a search limitation. Some search engines allow clients to limit future searches through the entry of client limitations to be added to any future search queries. Client interest data is not data supplied by a client with the intent to affect all future search requests. In an embodiment, client interest data changes dynamically over time based on the client's interaction with the system that tracks that data, which may not be the search system. In addition, some client interest data may not be directly provided by the client.

In the embodiment shown, the search system 206 has access to a client interest datastore 220 that contains client interest information. The interest data may also be retrieved from a central interest database or from multiple sources. The interest data may include data generated and/or retained by the search system as well as by other systems, independent of the search system, but to which the search system has access. In the embodiment shown, a client interest datastore 220 is maintained by a separate system, such as an social networking website like MySpace, a web portal such as Google, or a retail system such as Amazon.com or Barnes and Noble. The client interest information stored on the datastore 220 may include, for any given client, information that is passively collected through the client's interaction with the collecting system, e.g., past search queries, past web pages or products viewed or purchased, and past reviews of products or items. Some of the information stored in the datastore 220 may have been provided by the search system as a record of previous search requests from the client 202. In addition to interest information that is passively collected, actively provided information may be provided as well including personal profile information such as geographic location and demographic information, client interests and an identification of friends and other entities associated with the client.

The ID module 216 can inspect the search request information and determine, from that information and possibly in conjunction with other information not contained in the search request such as session data, who the client is. From this determination, the ID Module 216 can retrieve interest information from the client interest datastore 220.

The client's interest information is then used by the personalization module 218 to personalize the search query received from the client. As discussed in greater detail below, the personalization process includes comparing the client's interest information with the search query in order to assess what it is most likely that this client is actually looking for. From that assessment, limitations on the client's supplied search query are dynamically selected and new, limited or modified search query is generated. This new search query is then provided to the search module 210.

One possible means for dynamically selecting limitations from the client's interest is through the use of a relevance analysis. In computer science, relevance is a numerical score assigned to a search result, representing how well the result meets the information need of the user that issued the search query. In the simplest case, relevance can be calculated by examining how many times a query term appears in a document (term frequency), possibly combined with how discriminative that query term is across the searched collection (often called Term Frequency-Inverse Document Frequency). Many other, more complicated, relevance algorithms are known in the art and any suitable system, now known or later developed, may be incorporated into embodiments of the methods and systems described herein.

In the embodiment shown, the personalization module 218 includes a relevance module 214. The relevance module 214 performs a relevance analysis using the client's search query and the client's interest information, ultimately determining a limited search query. As discussed in greater detail below, the relevance module 214 may initially select the limitations based on a relevance analysis between the client's search query and the client's interest information, between the search results of the client's search query and the client's interest information, or between the search results of different limited searches performed with different selected limitations and the clients' interest information.

Also a relevance module 214 is shown, different embodiments may use different algorithms or methods of comparing the search query to the client interest information to modify/limit the original search query. For example, some indexes associate each item in the index with a category or some other identify and a search query may be inspected to determine its most likely subject category, e.g., a real estate query, a music query, local geographic query, a product query, a news query, etc. When such a determination is made, the system 206 may modify the initial search query by including a parameter corresponding to a category limitation in an advanced search, e.g., search only in the "news" category. In addition to the category limitation, additional methods could be developed for selecting parameters for each of the other possible advanced search options. In addition, to those described above, there are other algorithms and methods of comparing data that could be utilized including similarity analyses, cluster hypothesis and probability modeling. Any suitable method of comparing the search query to client interests and modifying the original search query may be adapted to the systems and methods described herein and are considered within the scope of this disclosure.

Regardless of the technique used, the search system 206 ultimately generates the limited search query and generates a limited search results set from the limited search query. The limited search results set is then transmitted to the client 202 in response to the search query submitted by the client. In an embodiment, the limited results set are transmitted via the communication module 212 and may take the form of a web page or other computer-readable data structure (e.g., a file in a known format) usable by the client.

Figure 3:
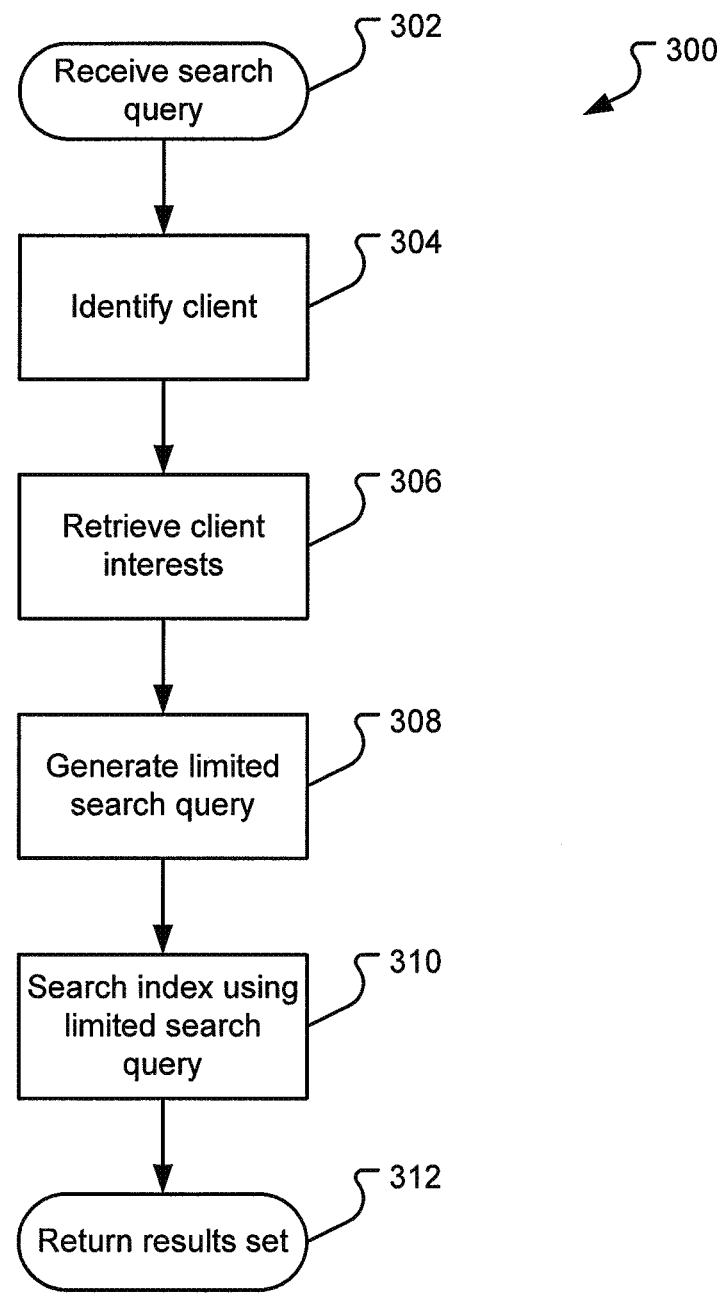
FIG. 3 illustrates an embodiment of a method for dynamically personalizing a search query.

FIG. 3 illustrates an embodiment of a method for dynamically personalizing a search query. In the method 300 shown, a client request including a search query is received in a receiving operation 302. The search query may include one or more search terms, such as keywords. In addition, the search query may include one or more parameters associated with an advanced search function. The request may include a command to search a specified or default index. The request may include many different elements such as the search query, client identification information, command, index identifier and return address for a results set.

In the method 300, the client is identified in an identification operation 304. The client may be identified as described above from information in or associated with the request. For example, the client may be associated with a user identifier due to a prior act of logging into the search system or other system associated with the search system. Alternatively, the client request may include a client identifier or client address or other information that allows the system to identify the client in the interest datastore.

After the client has been identified, the client's interests are retrieved in a retrieval operation 306. As described above, the interest information may include historical information in the form of records or data derived from the past actions of the client known to the system. The interest data may include passively collected data or data actively provided by the client through an interface.

Next, a limited search query is generated from the search query and the client's interests in a generate limited search query operation 308. This operation 308 dynamically generates the limited search based on the current client interests. This may include selecting one or more limitations, such as parameters or keywords, that are added to the search query terms provided by the client. Several embodiments of ways for generating a limited search query are discussed elsewhere in this disclosure. A detailed embodiment is provided with reference to FIG. 4, below.

In the embodiment shown, the index is searched for the limited search query in a limited search operation 310. The limited search operation 310 returns a results set for the limited search query. In an embodiment, the limited search operation 310 may be performed by using the search module to search the index for the limited search query. In an alternative embodiment, the full search results may be generated by searching the index for the original search query and then those results may be searched or modified to obtain the limited search results. Other methods of generating the limited search results from the limited search query are also possible. The limited search results are then transmitted to the client in a transmit operation 312.

In an embodiment, the client's search query is collected and used to modify the client's interests after the limited search operation 310 is performed (not shown) or, alternatively, as part of the limited search operation 310. The information collected and saved as client interest data may include information about the original search query and/or information about the limited search query. In the embodiment, this interest information then will have an effect on any future searches performed by the client. Because the search system dynamically analyzes the client's interest information (which is itself dynamic) for each search, the search system may never obtain the same personalization of a search query twice.

Figure 4:
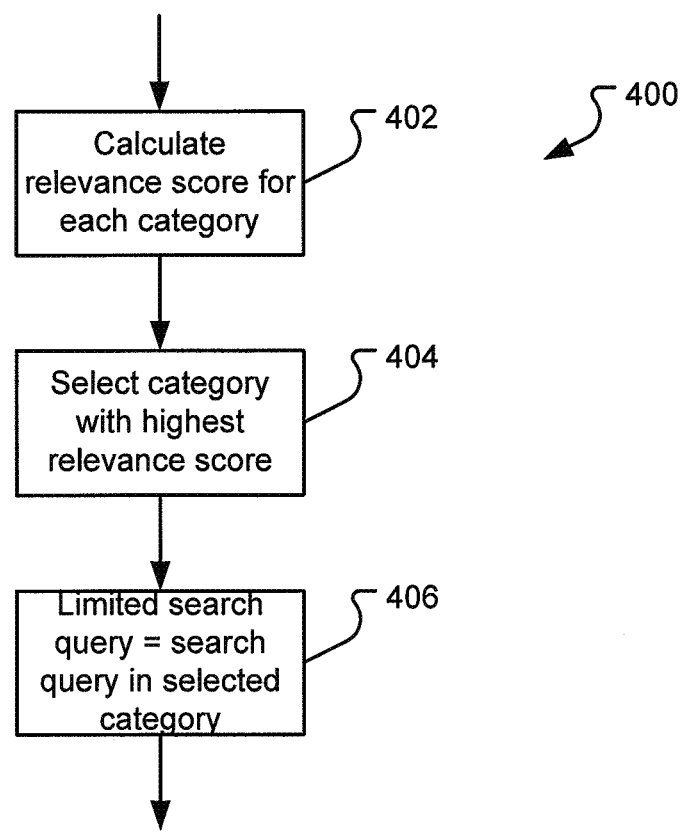
FIG. 4 illustrates an embodiment of a method for generating a limited search query from historical client interest data.

FIG. 4 illustrates an embodiment of a method for generating a limited search query from historical client interest data. In the embodiment described, the client's interest data has been previously categorized, for example as it was received over time. Thus, the client's interest data may include significant data associated with one or more predetermined interest categories.

In the method 400, the interest data and the search query terms are evaluated in a relevance operation 402. In the operation 402, one or more relevance algorithms are used to determine which interests of the client are relevant or otherwise related to the search query. In an embodiment, the client interest data is searched and compared to the terms and possibly other elements in the search query. The results of the relevance analysis include a numbered score for each interest category based on the client's categorized interests.

As discussed above, the relevance analysis may take many forms. For example, in an embodiment, the system may first identify the known categories in which a client has been interested in the past by inspecting the client's interest data (e.g., real estate) and then perform a relevance analysis of the search query to the different known categories of interest. The category with the highest relevance score then being selected 404 and used to identify a corresponding search parameter, such as a category limitation in an advanced search. In this embodiment, the limited search query is then identified 406 as the original search query performed only in the selected category. Other methods are also possible, for example selecting additional search query terms based on the relevance results and adding them to the original search query to generate a limited search query.

FIGS. 5-7 are screenshots illustrating different exemplary results sets transmitted in response to a search query, as they may be displayed to a client. FIGS. 5-7 are presented to illustrate the different results set that could be obtained depending on the dynamic client interest data and other factors. The embodiments illustrated are results sets transmitted in the form of a web page (e.g., a page of .html or .xml) intended to be viewed on a browser in operation on the client's device. FIGS. 5-7 illustrates results that could be obtained from a search query consisting of the keywords "pacific heights" entered with no relationship as a keyword search in a web page search engine such as Yahoo! Search as shown.

FIG. 5 illustrates the full results that would be obtained from the search query "Pacific Heights" absent any personalization. As can be seen, even on the initial page of results, the full search results set includes many different and completely unrelated index entries of web pages. For example, these full results include web pages related to informational sites for the movie "Pacific Heights", related to the eponymous San Francisco neighborhood, and various product listings for different formats of the eponymous movie.

FIG. 6 illustrates the limited results set that would be displayed by an embodiment of the personalized search system in response to the search query "pacific heights" based on client interest data indicating that the client had real estate interests. In the FIG., the search query textbox 602 indicates to the client that the search query entered was modified. The search query textbox 602 shows that the original search query was modified based on the client's past history of interaction with the system to the search query "pacific heights us cities". In this embodiment, the system added the search terms "us cities" to the original search query to create the limited search query shown. The limited search query in this instance consists of simple keywords. In an alternative embodiment, the indication may identify that a limiting parameter, as used in an advanced search algorithm, was added. FIG. 6 illustrates one embodiment of an indication that the search was personalized and that the results set is not the full results set of the original search query. Other embodiments include a pop-up window, a notification message, and a separate results set.

In FIG. 6, the illustrated first page of the limited results set primarily includes web page index entries related to the San Francisco neighborhood of Pacific Heights. In addition, some entries are also included that are related to the expected wave heights in the Pacific Ocean at different cities.

FIG. 7 illustrates the limited results set that would be displayed by an embodiment of the personalized search system in response to the search query "pacific heights" based on client interest data indicating that the client had entertainment interests. Similar to that shown in FIG. 6, the search query textbox 702 indicates to the client that the original search query was automatically modified into a limited search query, in this case that of "pacific heights entertainment". An inspection of the results set indicates that nearly of the results are related to the movie "Pacific Heights" in some way, except for a few listings related to entertainment available in and near the neighborhood of Pacific Heights.

A comparison of FIGS. 5-7 indicates that the search system describe creates very different results depending the client's interest data. Such a system can provide clients with narrow search results that are automatically focused into areas of the clients' known interests. In an embodiment (not shown), the client may also be provided, along with the limited results set, a control (e.g., a button or hyperlink) or other option that allows the full search results to be immediately transmitted if the system's personalized results set is not desired by the client.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, when a client is first introduced to the search system the client may be prompted to select a default concerning whether the client prefers to receive personalized search results or full search results. As another example, the limited search results may include the full results, but be ordered differently based on the user's interests. Numerous other changes may be made which will readily suggest themselves to those skilled in the art and which are encompassed in the spirit of the invention disclosed and as defined in the appended claims.

What is claimed is:

1. A method comprising:
    receiving, by a computing device, a search query from a client, the search query comprising a search term and being a command to search an index for entries matching the search term;
    retrieving, by the computing device, client interest data associated with the client, the client interest data comprising information collected from the client based on past searches performed by the client;
    calculating, by the computing device, term frequencies for the search term and the client interest data, a given term frequency representing a number of times the search term appears in a given item of client interest data;
    generating, by the computing device, for each term frequency, a relevancy score, the relevancy score comprising a term frequency-inverse document frequency;
    determining, by the computing device, one or more interest categories of the search query by identifying a category associated with at least one of the items of client interest data associated with a relevancy score;
    adding, by the computing device, one or more additional search terms to the search query to create a limited search query, the one or more additional search terms generated based on the one or more interest categories;
    identifying, by the computing device, one or more search results by searching the index for entries associated with the limited search query; and
    transmitting, by the computing device, to the client, the one or more search results.

2. The method of claim 1, wherein the client interest data is retrieved from a social networking website.

3. The method of claim 1, wherein the client interest data comprises past search queries.

4. The method of claim 1, wherein the client interest data comprises past web pages viewed.

5. The method of claim 1, wherein the client interest data comprises products purchased.

6. The method of claim 1, wherein the client interest data comprises past reviews of products or items.

7. The method of claim 1, wherein the client interest data comprises previous search requests.

8. The method of claim 1, further comprising performing a relevance analysis using the search query and the client interest data.

9. The method of claim 1, wherein the comparing of the search term with the client interest data further comprises comparing the search term with the client interest data by using similarity analyses, cluster hypothesis, or probability modeling.

10. A computer system comprising:

a processor;

a storage medium for tangibly storing thereon program logic for execution by the processor, the program logic comprising:

search query receiving logic executed by the processor for receiving a search query from a client, the search query comprising a search term and being a command to search an index for entries matching the search term;

client interest data retrieving logic executed by the processor for receiving client interest data associated with the client, the client interest data comprising information collected from the client based on past searches performed by the client;

frequency calculation logic executed by the processor for calculating term frequencies for the search term and the client interest data, a given term frequency representing a number of times the search term appears in a given item of client interest data;

relevancy score logic executed by the processor for generating for each term frequency, a relevancy score, the relevancy score comprising a term frequency-inverse document frequency;

interest category determining logic executed by the processor for determining one or more interest categories of the search query by identifying a category associated with at least one of the items of client interest data associated with a relevancy score;

search query modifying logic executed by the processor for adding one or more additional search terms to the search query to create a limited search query, the one or more additional search terms generated based on the one or more interest categories;

search result identifying logic executed by the processor for identifying one or more search results by searching the index for entries associated with the limited search query; and search result transmitting logic executed by the processor for transmitting, to the client, the one or more search results.

11. The computer system of claim 10, wherein the client interest data is retrieved from a social networking website.

12. The computer system of claim 10, wherein the client interest data comprises past search queries.

13. The computer system of claim 10, wherein the client interest data comprises past web pages viewed.

14. The computer system of claim 10, wherein the client interest data comprises products purchased.

15. The computer system of claim 10, wherein the client interest data comprises past reviews of products or items.

16. The computer system of claim 10, wherein the client interest data comprises previous search requests.

17. The computer system of claim 10, further comprising relevance analysis performing logic executed by the processor for performing a relevance analysis using the search query and the client interest data.

18. The computer system of claim 10, wherein the comparing of the search term with the client interest data further comprises comparing the search term with the client interest data by using similarity analyses, cluster hypothesis, or probability modeling.

19. A non-transitory computer readable storage medium tangibly storing computer program instructions capable of being executed by a processor of a computer system, the computer program instructions defining the steps of:

receiving, by the computer system, a search query from a client, the search query comprising a search term and being a command to search an index for entries matching the search term;

retrieving, by the computer system, client interest data associated with the client, the client interest data comprising information collected from the client based on past searches performed by the client;

calculating, by the computer system, term frequencies for the search term and the client interest data, a given term frequency representing a number of times the search term appears in a given item of client interest data;

generating, by the computer system, for each term frequency, a relevancy score, the relevancy score comprising a term frequency-inverse document frequency;

determining, by the computer system, one or more interest categories of the search query by identifying a category associated with at least one of the items of client interest data associated with a relevancy score;

adding, by the computer system, one or more additional search terms to the search query to create a limited search query, the one or more additional search terms generated based on the one or more interest categories;

identifying, by the computer system, one or more search results by searching the index for entries associated with the limited search query; and transmitting, by the computer system, to the client, the one or more search results.

20. The non-transitory computer readable storage medium of claim 19, wherein the client interest data is retrieved from a social networking website.

* * * * *